(No Model.)
T. B. ATTERBURY.
GLASS MOLD AND MANUFACTURE OF GLASS SIGNS, &c.
No. 267,659. Patented Nov. 21, 1882.
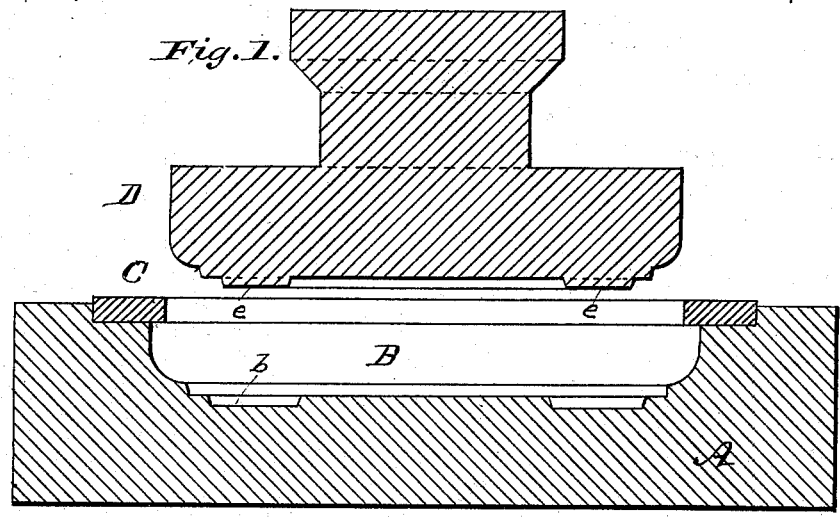
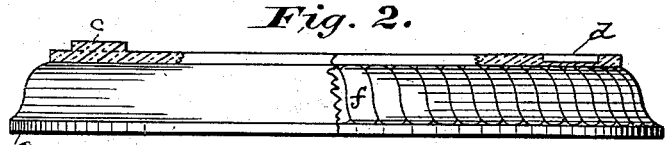
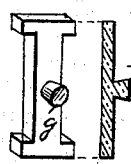
Witnesses:
Inventor:
Tho B Atterbury

UNITED STATES PATENT OFFICE.

THOMAS B. ATTERBURY, OF PITTSBURG, PENNSYLVANIA.

GLASS-MOLD AND MANUFACTURE OF GLASS SIGNS, &c.

SPECIFICATION forming part of Letters Patent No. 267,659, dated November 21, 1882.

Application filed October 14, 1882. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in Glass-Molds and in the Manufacture of Glass Signs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to glass molds and in the manufacture of glass signs, for advertising and other purposes, formed of one piece of glass, with the letters, figures, or particular trade-marks stamped therein or thereon, as will more fully hereinafter appear.

Referring to the drawings, Figure 1 is a sectional view of the mold and plunger. Fig. 2 is a side view, partly in section, of a sign or advertising-tablet. Fig. 3 is a front view of the same. Fig. 4 is a perspective and sectional view of a letter, showing the lug by which the letter or letters are held in place in the body of the glass.

Glass signs and advertising-tablets as now made are constructed from plate or sheet glass, with the letters, numbers, and other indicating symbols or ornamental designs painted, printed, or pasted thereon; but, so far as I am aware, I am the first to make glass signs and advertising-tablets of one piece of blown or pressed glass, with the letters, figures, or ornamental designs impressed thereon or therein in the process of manufacture.

I will first describe the molds and the manner of operating the same, and then point out the advantages of a glass sign or advertising-tablet made from one piece of glass in a mold, together with numerous modifications, which will come within the scope of my invention.

A is the body or base of the mold, and is provided with a cavity, B, of any desired configuration, round, square, hexagonal, or of any desired form in which the article is formed. The mold body or base may be made in two sections hinged together in the usual manner, or may be composed of a single piece. The mold is also provided with the usual ring, C, which arrests the upward flow of glass and forms the upper edge of the projecting flange or border $a$ of the article. The lower portion of the cavity B is provided with cavities or projections $b$, which are to give form and character to the words, letters, figures, or designs to be produced on the article. If the letters, &c., are to be produced in relief on the article, then corresponding depressions are made in the mold; while, on the other hand, if the letters, words, &c., are to appear in depression, then corresponding elevations are to be placed in the mold-bottom.

Should it be desirable to have the face or faces of the tablet smooth and even, the depressed portions which form the letters, words, &c., may be filled in with any suitable colored cement, which can be polished down and give a very æsthetic effect to the sign.

If I desire to produce a slab of uniform thickness, then the letters, figures, or designs will be made both on the bottom of the mold and also on the bottom of the plunger D.

The mold-cavity B may also be provided with an ornamental border of any desired configuration which will produce the design or border required, such design or border being shown at $f$, in Figs. 2 and 3. In Fig. 2 I have shown the article with projecting letters $c$ and letters in depression $d$.

D is the plunger, and is provided with a projecting band, $e$, for forming a circular or segmental cavity in the article to correspond with a like cavity in the mold-bottom, in order to produce an article of uniform thickness, so that it can be readily annealed and not fly to pieces in the annealing-furnace. The lower end of the plunger may have the letters, figures, &c., formed thereon in relief, and the bottom of the mold have the same letters, figures, &c., in depression. This will produce an article having raised letters, figures, or other device on one side, while the other side of the article will bear the same letters in depression, which may or may not be filled up with a colored cement, as heretofore described.

Several circular or segmental cavities may be made in the mold bottom, and also cavities at varying angles or of any desired configuration may be made therein, so that when any particular design is to be given the article, or any desired word or combination of words or figures are to be produced on the article it can be done in the following manner: In Fig. 4, I have given as an example only the letter I;

but it is understood that all the letters of the alphabet in any language, and all the numerals and figures can be employed in the same manner as the letter given in illustration. These letters, figures, numerals, or designs may be made of metal capable of taking a high polish, or they may be made of glass of any desired color, and they are provided on their rear sides with dovetailed pins or tongues g, by which they are held in the article when the glass is pressed down upon them in the formation of the tablet. These letters, figures, &c., I arrange in the circular or other shaped groove or cavity in the mold bottom to form the desired word or combination of words with the projections or pins g uppermost. The molten glass is then introduced into the mold-cavity and the plunger depressed to form the article. The glass will be forced around the pins or projections g and around the main body of the letters or figures, and they will thus be embedded or held fast in the article.

Instead of having the spaces between the letters, &c., filled with the glass, which forms the body of the article, I may fill in with metallic or other blanks formed for that purpose, and of a different color, or ornamental bands, rings, or ornaments of any desired kind or of any desired material may be produced on the article in this way.

It may be well to remark in this connection that if metallic or other letters are used they should be heated before the molten glass is forced on or around them, so as to prevent the cracking of the glass.

The mold and process just described are more particularly designed for making signs where but few are required, and where it would be impracticable to make them otherwise, owing to the expense of making a special mold; but when large orders are given for a particular sign, as in advertising certain articles—e. g., particular brands of cigars, certain kinds of tobacco, or trade-marks of any kind of goods—it will be better and more economical to have a special mold made with the particular letters or design therein in elevation or in depression. This will produce an article such as is shown in Fig. 3—i. e., with the letters or figures or other design—as a horseshoe in relief or in depression, to suit the caprice or demand of the trade. The letters or figures may then be ground, etched, painted, or stained, or the groundwork or body of the article may be painted, leaving the letters, figures, or design of the natural color of the glass.

In Letters Patent No. 265,300 granted to me October 3, 1882, I have more particularly described and claimed the method of ornamenting and producing letters, figures, and designs on glass articles having raised or depressed surfaces, so that a further description here is deemed unnecessary.

I do not confine myself to slabs or plates of glass with the letters or figures pressed thereon or therein as the only means of producing signs and advertising devices, for it is obvious other forms may be used which are included within the scope of my invention. I may, for instance, for the use of druggists and physicians, make the sign in the shape of a mortar, which is the well-known and recognized symbol of this trade or profession. These mortars may be pressed or blown in a mold with the letters or figures in the sides of the mold which are to be produced on the article in elevation or in depression. Hats may be thus formed to advertise this particular branch of trade. Saws, circular or straight, and anvils or sledge-hammers to designate a hardware-store or place where these kinds of goods are sold, and in like manner almost any kind of sign indicating a particular trade or line of goods can be produced in a single piece of glass with the letters, words, or figures impressed therein or thereon in a comparatively cheap and artistic manner. The field is so large that I have thought it unnecessary to show in the drawings all the various articles which may be made and used for signs and for advertising purposes.

I am aware that bottles and various other articles have been formed with letters stamped or blown therein to indicate the contents and proprietorship, and such I do not claim.

Having thus described my invention, what I claim, and desire to secure by Letters Patent, is—

1. A mold for producing glass signs, advertising-tablets, &c., provided with recesses or cavities in the bottom thereof for the reception of letters, figures, designs, &c., which are pressed into the article and become a part thereof, as set forth.

2. A mold for forming articles of glass for signs and advertising purposes, having formed therein letters, figures, or designs, in relief, or in depression, in combination with a plunger having corresponding letters, figures, &c., on its under or pressing surface, as set forth.

3. A sign or advertising device made of a single piece of glass, pressed or blown, and having the words, letters, figures, designs or characters of any kind formed thereon or therein, and made part thereof, as set forth.

4. As an article of manufacture, a sign or advertising device pressed or blown from a body of glass, with metallic or other letters, figures, designs, or ornaments embedded therein and forming a part thereof, as described.

5. A sign or advertising-tablet pressed or blown from glass, having the letters, figures, or designs pressed or formed therein, said letters, figures, or designs being filled in with cement or other suitable material of a different color from the body of the glass, as set forth.

In testimony whereof I affix my signature in presence of two witnesses.

THOS. B. ATTERBURY.

Witnesses:
D. P. BERG,
W. F. WENKE.